(12) United States Patent
Ohmori et al.

(10) Patent No.: US 7,767,357 B2
(45) Date of Patent: Aug. 3, 2010

(54) REACTOR

(75) Inventors: Makoto Ohmori, Nagoya (JP); Natsumi Shimogawa, Nagoya (JP); Toshiyuki Nakamura, Nagoya (JP); Tsutomu Nanataki, Toyoake (JP)

(73) Assignee: NGK Insulators, Ltd., Nagoya (JP)

( * ) Notice: Subject to any disclaimer, the term of this patent is extended or adjusted under 35 U.S.C. 154(b) by 36 days.

(21) Appl. No.: 12/174,672

(22) Filed: Jul. 17, 2008

(65) Prior Publication Data
US 2009/0023045 A1 Jan. 22, 2009

(30) Foreign Application Priority Data

Jul. 20, 2007 (JP) ............................. 2007-189332
May 21, 2008 (JP) ............................. 2008-132737

(51) Int. Cl.
*H01M 8/00* (2006.01)
*H01M 8/10* (2006.01)
*H01M 2/00* (2006.01)
*H01M 2/02* (2006.01)
*H01M 2/14* (2006.01)

(52) U.S. Cl. ....................... 429/465; 429/400; 429/452; 429/456; 429/544

(58) Field of Classification Search ................... 429/13, 429/32, 33, 34, 39
See application file for complete search history.

(56) References Cited

U.S. PATENT DOCUMENTS

| | | | | |
|---|---|---|---|---|
| 5,273,837 | A | * | 12/1993 | Aitken et al. .................. 429/30 |
| 7,323,268 | B2 | | 1/2008 | Robert |
| 2005/0069749 | A1 | * | 3/2005 | Frank et al. .................. 429/38 |

FOREIGN PATENT DOCUMENTS

| | | | |
|---|---|---|---|
| DE | 198 35 253 A1 | | 1/2000 |
| JP | 04-058462 A1 | | 2/1992 |
| JP | 11-016585 A1 | | 1/1999 |
| JP | 11016585 A | * | 1/1999 |
| JP | 2004-342584 A1 | | 12/2004 |
| WO | 01/78179 A1 | | 10/2001 |
| WO | WO 0178179 A1 | * | 10/2001 |

* cited by examiner

*Primary Examiner*—Jennifer K Michener
*Assistant Examiner*—Eli S Mekhlin
(74) *Attorney, Agent, or Firm*—Burr & Brown

(57) ABSTRACT

A solid oxide fuel cell has a stack structure in which sheet bodies and support members are stacked in alternating layers. A space through which a fuel gas or air flows is formed between the adjacent sheet body and support member. Partitions are provided on the support member in such a manner as to stand in the space, thereby forming a "first flow F1" of gas according to the flow control effected by the partitions. Gaps are formed at the projecting ends of the partitions, thereby forming a "second flow F2" of gas which flows over the partitions and through the gaps. The ratio "gap/space height" is set to 2% to 50% inclusive.

12 Claims, 10 Drawing Sheets

REACTOR

BACKGROUND OF THE INVENTION

1. Field of the Invention

The present invention relates to a reactor, such as a solid oxide fuel cell (SOFC), and particularly to a reactor having a (flat-plate) stack structure in which sheet bodies and support members for supporting the sheet bodies are stacked in alternating layers.

2. Description of the Related Art

Conventionally, a solid oxide fuel cell having the above-mentioned stack structure has been known (refer to, for example, Japanese Patent Application Laid-Open (kokai) No. 2004-342584). In this case, the sheet body (may also be referred to as the "single cell") can be a fired body in which a solid electrolyte layer formed from zirconia (ceramic), a fuel electrode layer, and an air electrode layer are arranged in layers such that the fuel electrode layer is formed on the upper surface of the solid electrolyte layer and such that the air electrode layer is formed on the lower surface of the solid electrolyte layer. Hereinafter, the support member (may also be referred to as the "interconnector") adjacent to the upper side of each of the sheet bodies may also be referred to as the "upper support member," and the support member adjacent to the lower side of each of the sheet bodies may also be referred to as the "lower support member."

The support member can be configured to have a plane portion and a frame portion, which is provided along the entire perimeter of the plane portion and whose thickness is greater than that of the plane portion. In this case, each of the sheet bodies is held between the upper and lower support members such that the entire perimetric portion of the sheet body is sandwiched between the frame portion of the upper support member and the frame portion of the lower support member. By employment of this configuration, the lower surface of the plane portion of the upper support member, the inner wall surface of the frame portion of the upper support member, and the upper surface of the fuel electrode layer of the sheet body can define a first space through which a fuel gas flows. Similarly, the upper surface of the plane portion of the lower support member, the inner wall surface of the frame portion of the lower support member, and the lower surface of the air electrode layer of the sheet body can define a second space through which a gas (air) that contains oxygen flows.

According to the above configuration, in a state in which the sheet bodies are heated to a working temperature of the solid oxide fuel cell (e.g., 800° C.; hereinafter, merely referred to as the "working temperature"), a fuel gas and air are caused to flow through the first and second spaces, respectively, whereby the fuel gas and air come into contact with the upper surfaces and the lower surfaces, respectively, of the sheet bodies. As a result, electricity-generating reactions occur in the sheet bodies.

SUMMARY OF THE INVENTION

For convenience of description, in the following description, the first and second spaces are collectively referred to as the "space," and a fuel gas and air are collectively referred to as the "gas."

In order to flow the gas through the space, the gas is introduced into the space through an inlet which is provided at a predetermined position (e.g., in a perimetric region of the space) as viewed in plane, and flows out through an outlet which is provided at a position different from that of the inlet as viewed in plane (e.g., at a position located in the perimetric region of the space and distant from the inlet). In this case, the larger the area of a region of the space through which the gas flows as viewed in plane (accordingly, a region of the space through which the gas flows and in which the gas comes into contact with the sheet body, as viewed in plane) (hereinafter, the area is referred to as the "flow area"), the more effectively electricity-generating reactions can occur in the sheet body.

In the absence of a member which controls a gas flow channel (hereinafter, may be referred to merely as the "flow channel") extending from the inlet to the outlet in the space, generally, the gas tends to flow such that the flow channel becomes as short as possible. In this case, conceivably, a region of low gas concentration (a region of low gas flow rate) is present; thus, the practically effective flow area reduces, resulting in a failure in effective occurrence of electricity-generating reactions in the sheet body. Therefore, the degree of unevenness of gas flow velocity (the degree of unevenness of gas concentration) must be reduced for increasing a practically effective flow area.

Meanwhile, generally, in order to improve the electricity generation efficiency of a system as a whole, the fuel cell is desired to have a high gas utilization rate (the flow rate ratio of consumed gas to inflow gas). Specifically, both the fuel utilization rate and the air utilization rate are desired to be high. However, in a state where a region of low gas concentration is present (i.e., in a state where the degree of unevenness of gas flow velocity is large) as mentioned above, increasing the gas utilization rate (i.e., reducing the fuel inflow rate and the air inflow rate) causes a further drop in gas concentration in the region of a low gas concentration.

In addition to the above phenomenon, because air is less likely to diffuse as compared with the fuel gas (e.g., hydrogen), a region of very low oxygen concentration can arise in the vicinity of the surface of the air electrode layer. The region of low oxygen concentration lacks the amount of oxygen required for generation of electricity and thus may have a reducing atmosphere. As a result, a portion of the air electrode layer which corresponds to the region is reduced/decomposed, so that the portion of the air electrode layer potentially fails to sufficiently exhibit a catalytic function. In view of this, the degree of unevenness of gas flow velocity (the degree of unevenness of gas concentration) must be reduced for increasing a practically effective flow area.

A conceivable measure to meet the above requirement is to intentionally control the flow channel for increasing the practically effective flow area. To implement the measure, for example, a flow control portion (e.g., a partition or a projection) may be formed on the plane of the plane portion of the support member in such a manner as to project toward the plane of the sheet body which faces the plane of the plane portion of the support member. Through provision of the flow control portion, as viewed in plane, a gas flow can be, for example, made to meander, whereby the flow area can be increased (see a flow F1 in FIGS. 6 and 7, which will be described later). Hereinafter, a flow of gas that is controlled by such a flow control portion is referred to as the "first flow." By virtue of formation of the "first flow," the gas is supplied throughout the space, thereby increasing the flow area and thus accelerating electricity-generating reactions. This effect is referred to as the "flow-control-portion-induced reaction acceleration effect."

Meanwhile, with respect to a direction perpendicular to a planar direction of the sheet body, the distance (space height) between the plane of the plane portion of the support member and the plane of the sheet body which faces the plane of the plane portion of the support member is hereinafter referred to as the "first distance," whereas the distance (gap) between the plane of the sheet body and the projecting end of the flow control portion is hereinafter referred to as the "second distance." A problem to be solved is how to determine the ratio (hereinafter referred to as the "gap ratio") of the second distance to the first distance.

Specifically, when the gap ratio is "0" (i.e., the projecting end of the flow control portion is in contact with the plane of the sheet body, so that the gap (>0) is not formed), as viewed in plane, the gas cannot come into contact with the sheet body at least in a region where the projecting end of the flow control portion is in contact with the plane of the sheet body; thus, the region cannot serve as a part of the flow area. As a result, the "flow-control-portion-induced reaction acceleration effect" cannot be sufficiently yielded.

Accordingly, in order for a region corresponding to the flow control portion as viewed in plane to serve as a part of the flow area, the gap ratio must assume a value greater than "0" (i.e., a gap (>0) must be formed). Through employment of such a gap ratio, in addition to the "first flow," a "second flow" which flows over the flow control portion through the gap and along as short a flow channel as possible is generated (see a flow F2 in FIGS. 6 and 7).

By virtue of the generation of the "second flow," as viewed in plane, a region corresponding to the flow control portion can serve as a part of the flow area. Additionally, since the "second flow" flows through the gap, the "second flow" is formed in a region of the space which is located in the vicinity of the plane of the sheet body. Thus, the generation of the "second flow" in addition to the "first flow" can further accelerate electricity-generating reactions. This effect is referred to as the "gap-induced reaction acceleration effect."

Further, the "second flow" can remove, from the fuel electrode layer, water vapor which is unavoidably generated on the fuel-electrode-layer side in association with electricity-generating reactions. Thus, the "second flow" can also restrict a drop in electricity generation efficiency, which could otherwise result from stagnation of water vapor in or adsorption of water vapor to the fuel electrode layer. Since the "second flow" is generated in the vicinity of the fuel electrode layer, the "second flow" can effectively remove adsorbed water vapor from the surface of the porous electrode.

The inventor of the present invention has found that, through employment of a certain range of the gap ratio (>0), the "gap-induced reaction acceleration effect" can be effectively yielded.

In view of the foregoing, an object of the present invention is to provide a small-sized reactor having a (flat-plate) stack structure in which sheet bodies and support members are stacked in alternating layers and characterized in that, when gas flow channels for the "first flow" and the "second flow" are formed, chemical reactions in the sheet bodies can be effectively accelerated.

To achieve the above object, a reactor according to the present invention comprises a single or a plurality of sheet bodies which contain at least ceramic and in which chemical reactions occur, and a plurality of support members for supporting the single or the plurality of sheet bodies, each support member having a plane portion, and a frame portion provided along the entire perimeter of the plane portion and thicker than the plane portion, and is configured such that the single or the plurality of sheet bodies and the plurality of support members are stacked in alternating layers. In view of a reduction in the overall size of the reactor, preferably, each of the sheet bodies has a thickness of 20 µm to 500 µm inclusive, and the thickness is uniform over the entire sheet body.

Each of the sheet bodies is held between the upper support member and the lower support member in such a manner that a perimetric portion of the sheet body is sandwiched between the frame portion of the upper support member and the frame portion of the lower support member, whereby a lower surface of the plane portion of the upper support member, an inner wall surface of the frame portion of the upper support member, and an upper surface of the sheet body define a first space through which a first gas flows and whereby an upper surface of the plane portion of the lower support member, an inner wall surface of the frame portion of the lower support member, and a lower surface of the sheet body define a second space through which a second gas flows.

Additionally, a flow control portion is formed on the lower surface (upper surface) of the plane portion of the upper support member (lower support member) in such a manner as to project downward (upward) from the lower (upper) surface for controlling a flow channel extending between an inlet through which the first gas (second gas) flows into the first space (second space), and an outlet through which the first gas (second gas) flows out from the first space (second space). The formation of the flow control portion generates the aforementioned "first flow," thereby yielding the "flow-control-portion-induced reaction acceleration effect."

The reactor according to the present invention is characterized in that, with respect to a direction perpendicular to a planar direction of the sheet body, a distance (first distance or space height) between the upper surface (lower surface) of the sheet body and the lower surface (upper surface) of the plane portion of the upper support member (lower support member) and a distance (second distance or gap) between the upper surface (lower surface) of the sheet body and a projecting end of the flow control portion are such that the ratio (i.e., the aforementioned gap ratio) of the second distance to the first distance falls within a range of 2% to 50% inclusive.

According to the above configuration, the gap ratio is greater than "0." Thus, in addition to the "first flow," the aforementioned "second flow" can be generated, so that the "gap-induced reaction acceleration effect" can be yielded. As the velocity of the "first flow" increases, the "flow-control-portion-induced reaction acceleration effect" tends to be intensified. As the velocity of the "second flow" increases, the "gap-induced reaction acceleration effect" tends to be intensified.

According to our studies, when the gap ratio is less than 2% or in excess of 50%, the velocity of the "second flow" becomes excessively low, so that the "gap-induced reaction acceleration effect" cannot be sufficiently yielded (see FIG. 9, which will be described later). Additionally, when the gap ratio is in excess of 50%, the percentage of the "first flow" with respect to the flow of gas flowing through the space reduces significantly, so that the velocity of the "first flow" drops significantly. Therefore, the "flow-control-portion-induced reaction acceleration effect" cannot be sufficiently yielded.

When the gap ratio falls within a ratio of 2% to 50% inclusive as in the case of the configuration of the present invention, the "flow-control-portion-induced reaction acceleration effect" associated with the "first flow" can be stably yielded, and additionally, the "gap-induced reaction acceleration effect" associated with the "second flow" can be effectively yielded. Therefore, when the gap ratio falls within the ratio of 2% to 50% inclusive, chemical reactions (e.g., electricity-generating reactions) which occur in the sheet bodies can be effectively accelerated.

In this case, preferably, the second distance (gap) is 20 µm or more. According to our studies, when the second distance is less than 20 μm, the velocity of the "second flow" drops significantly, regardless of the gap ratio, so that the "gap-induced reaction acceleration effect" cannot be sufficiently yielded. Therefore, in order to effectively accelerate chemical reactions (e.g., electricity-generating reactions) which occur in the sheet bodies, it is preferred to set the second distance to 20 μm or more, while setting the gap ratio such that it falls within the range of 2% to 50% inclusive.

Preferably, the reactor according to the present invention is a solid oxide fuel cell. In this case, each of the sheet bodies is a fired laminate of a solid electrolyte layer, a fuel electrode layer formed on an upper surface of the solid electrolyte layer, and an air electrode layer formed on a lower surface of the solid electrolyte layer; the first gas is a fuel gas; and the second gas is a gas that contains oxygen. In the sheet bodies, chemical reactions; i.e., electricity-generating reactions, occur at a working temperature greatly higher than room temperature (the working temperature is 600° C. or higher, preferably 800° C.).

Preferably, in the reactor according to the present invention, when the first distance is 50 μm to 1,000 μm inclusive, a minimum radius of curvature on an outer surface of the flow control portion projecting from the upper surface or the lower surface of the plane portion of the support member is 20 μm or more. This enables the gas associated with the "second flow" to flow smoothly over the flow control portion. As a result, a drop in the velocity of the "second flow," which drop occurs due to presence of the flow control portion over which the gas flows, is suppressed, whereby the "gap-induced reaction acceleration effect" associated with the "second flow" can be yielded more effectively.

At a high temperature equivalent to the above-mentioned working temperature of the solid oxide fuel cell, the viscosity of the gas increases greatly; thus, the gas tends to encounter difficulty in flowing over the flow control portion. Therefore, the above-mentioned configuration is particularly effective for the reactor (e.g., solid oxide fuel cell) whose working temperature is high (e.g., 300° C. to 1,000° C. or 400° C. to 900° C.).

Next, the first distance (space height) and the second distance (gap) will be additionally described. As mentioned above, when the sheet body is very thin, the sheet body is apt to be deformed (warped) in a direction perpendicular to a planar direction. Particularly, in the case of a solid oxide fuel cell, when the sheet body is raised in temperature from room temperature to the working temperature, a difference in thermal expansion coefficient among the above-mentioned three layers used to form the sheet body readily causes a deformation of the sheet body along the direction perpendicular to the planar direction. Such a deformation of the sheet body in the direction perpendicular to the planar direction is accompanied by a change in the first and second distances.

In the present invention, in principle, the "first distance" and the "second distance" are measured at a position which corresponds to the flow control portion as viewed in plane, in a state where the reactor is in use (in consideration of deformation of the sheet body). In the case where a plurality of flow control portions are provided, it suffices that the gap ratio associated with at least a single flow control portion falls within the range of 2% to 50% inclusive, and it suffices that the second distance associated with at least a single flow control portion is 20 μm or more.

In the reactor according to the present invention, a current-collecting member (e.g., embossed metal mesh) which is confined in the first space and/or the second space for ensuring an electrical connection between the support member and the sheet body may be used as the flow control portion. When such a current-collecting member (e.g., metal mesh) is confined in the first space and/or the second space, a practically effective flow area can be increased. That is, such a current-collecting member can also function as the above-mentioned flow control portion.

In this case, the current-collecting member (e.g., metal mesh) is arranged and configured such that a part of projections (protrusions which are to come into contact with the sheet body) projecting toward the sheet body are in contact with the sheet body, whereas the remaining projections are not in contact with the sheet body. The distance (gap) between the sheet body and the projecting ends of the remaining projections corresponds to the aforementioned second distance (T2).

By means of a part of the projections being in contact with the sheet body as mentioned above, an electrical connection is ensured between the support member and the sheet body. Additionally, if the gap ratio (T2/T1) associated with at least one of the above-mentioned remaining projections falls within the range of 2% to 50% inclusive, as mentioned previously, the "flow-control-portion-induced reaction acceleration effect" associated with the "first flow" can be stably yielded, and additionally, the "gap-induced reaction acceleration effect" associated with the "second flow" can be effectively yielded. Further, preferably, the second distance (gap) associated with at least one of the remaining projections is 20 μm or more. As mentioned previously, this enables the "gap-induced reaction acceleration effect" to be sufficiently yielded.

DETAILED DESCRIPTION OF THE INVENTION

Figure 1:
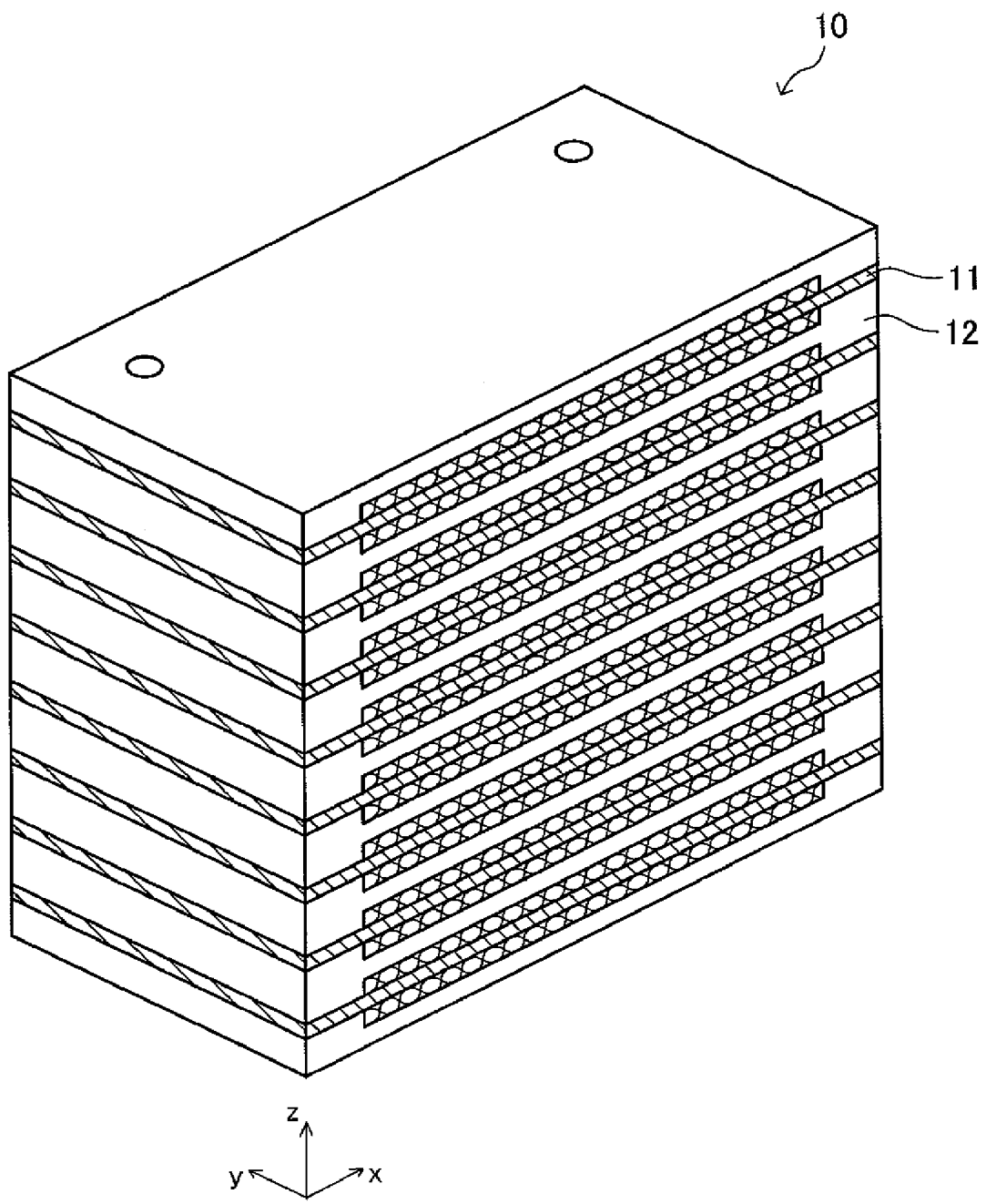
FIG. 1 is a perspective cutaway view of a solid oxide fuel cell according to an embodiment of the present invention.
Figure 2:
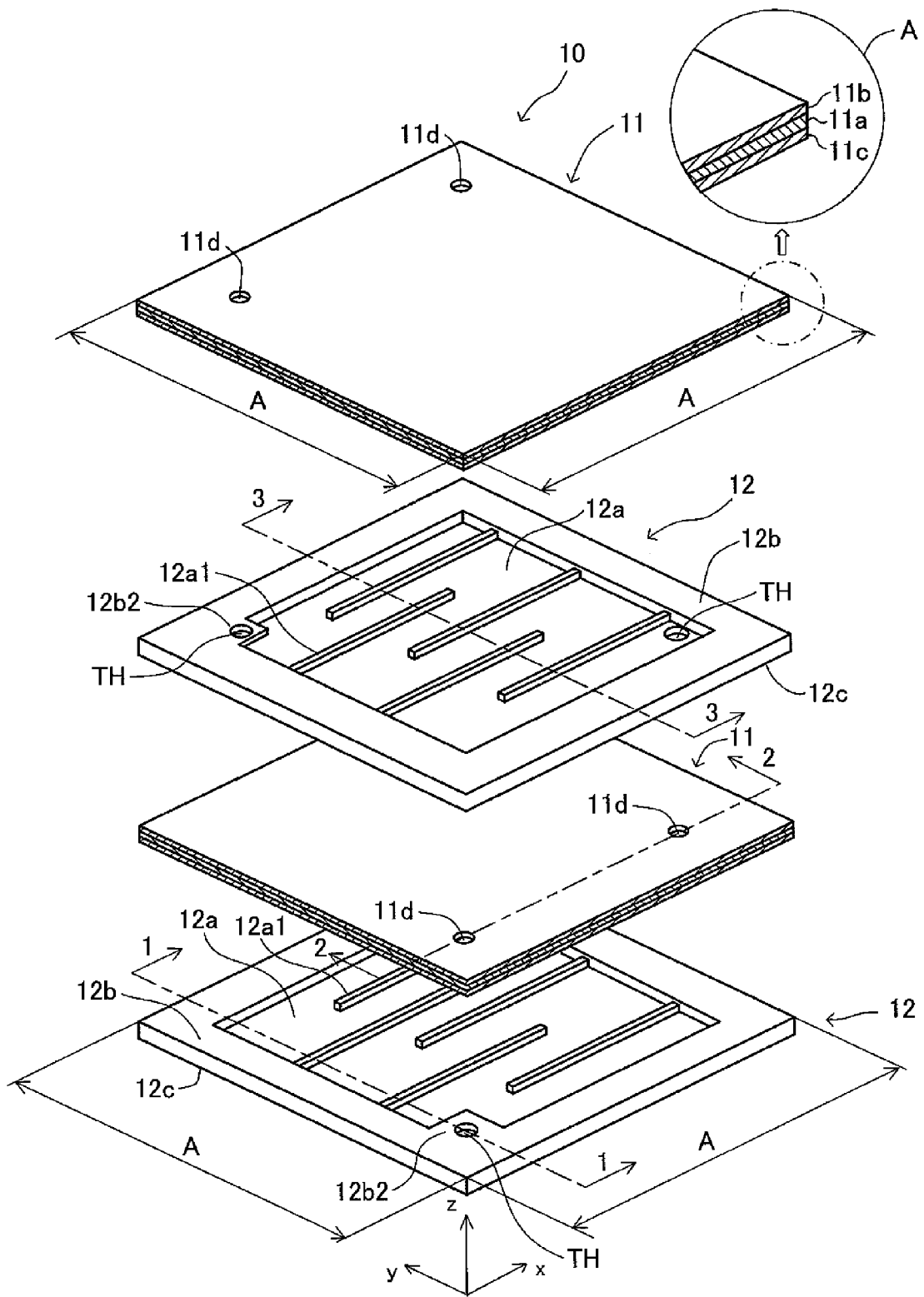
FIG. 2 is an exploded partial, perspective view of the fuel cell shown in FIG. 1.

A solid oxide fuel cell (reactor) according to an embodiment of the present invention will next be described with reference to the drawings. Overall structure of fuel cell:

FIG. 1 perspectively shows, in a cutaway fashion, a solid oxide fuel cell (hereinafter, referred to merely as the "fuel cell") 10, which is a device according to an embodiment of the present invention. FIG. 2 perspectively and partially shows, in an exploded fashion, the fuel cell 10. The fuel cell 10 is configured such that sheet bodies 11 and support members 12 are stacked in alternating layers. That is, the fuel cell 10 has a flat-plate stack structure. The sheet body 11 is also referred to as a "single cell" of the fuel cell 10. The support member 12 is also referred to as an "interconnector."

As shown on an enlarged scale within a circle A of FIG. 2, the sheet body 11 has an electrolyte layer (solid electrolyte layer) 11a, a fuel electrode layer 11b formed on the electrolyte layer 11a (on the upper surface of the electrolyte layer 11a), and an air electrode layer 11c formed on a side of the electrolyte layer 11a opposite the fuel electrode layer 11b (on the lower surface of the electrolyte layer 11a). The planar shape of the sheet body 11 is a square having sides (length of one side=A) extending along mutually orthogonal x- and y-axes. The sheet body 11 has a thickness along a z-axis orthogonal to the x-axis and the y-axis.

In the present embodiment, the electrolyte layer 11a is a dense fired body of YSZ (yttria-stabilized zirconia). The fuel electrode layer 11b is a fired body of Ni—YSZ and a porous electrode layer. The air electrode layer 11c is a fired body of LSM (La(Sr)MnO$_3$: lanthanum strontium manganite)-YSZ and a porous electrode layer. The electrolyte layer 11a, the fuel electrode layer 11b, and the air electrode layer 11c have different room-temperature-to-1,000° C. mean thermal expansion coefficients of about 10.8 ppm/K, 12.5 ppm/K, and 11 (10.8) ppm/K, respectively. The air electrode layer 11c may be a fired body of LSCF (lanthanum strontium cobalt ferrite). In this case, the air electrode layer 11c has a room-temperature-to-1,000° C. mean thermal expansion coefficient of 12 ppm/K.

The sheet body 11 has a pair of cell through-holes 11d. Each of the cell through-holes 11d extends through the electrolyte layer 11a, the fuel electrode layer 11b, and the air electrode layer 11c. The paired cell through-holes 11d are formed in the vicinity of one side of the sheet body 11 and in the vicinity of corresponding opposite ends of the side.

Figure 3:
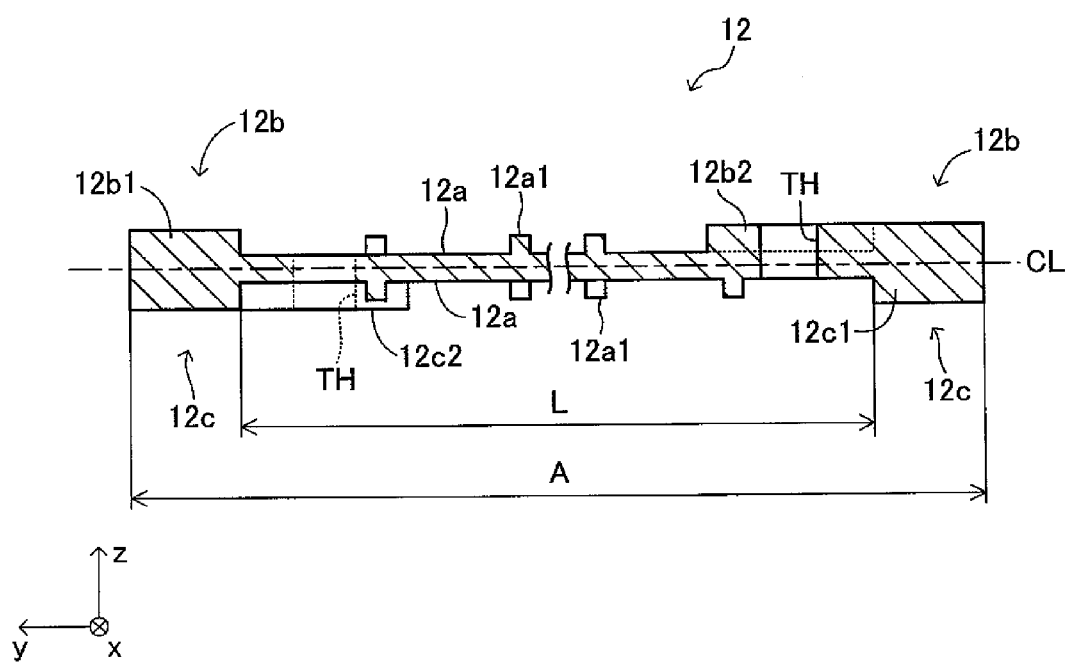
FIG. 3 is a sectional view of a support member taken along a plane which includes line 1-1 of FIG. 2 and is in parallel with an y-z plane.

FIG. 3 is a sectional view of the support member 12 taken along a plane which includes line 1-1 of FIG. 2 parallel with the y-axis and is in parallel with the y-z plane.

As shown in FIGS. 2 and 3, the support member 12 includes a plane portion 12a, an upper frame portion 12b, and a lower frame portion 12c. The upper frame portion 12b and the lower frame portion 12c collectively correspond to the aforementioned "frame portion." The planar shape of the support member 12 is a square having sides (length of one side=A) extending along the mutually orthogonal x- and y-axes and is identical with that of the sheet body 11.

The support member 12 is formed from an Ni-based heat-resistant alloy (e.g., ferritic SUS, INCONEL 600, or HASTELLOY). The support member 12 formed from, for example, SUS430, which is a ferritic SUS, has a room-temperature-to-1,000° C. mean thermal expansion coefficient of about 12.5 ppm/K. Thus, the thermal expansion coefficient of the support member 12 is higher than the mean thermal expansion coefficient of the sheet body 11.

The plane portion 12a is a thin, flat body having a thickness along the z-axis. The planar shape of the plane portion 12a is a square having sides (length of one side=L (<A)) extending along the x-axis and the y-axis.

A plurality of (five in the present embodiment) bar-like partitions 12a1 (corresponding to the aforementioned "flow control portions) are arranged on the upper surface of the plane portion 12a, in parallel with the x-axis, at predetermined intervals along the y-axis, and in such a manner as to extend in a staggered manner from one of the two inner wall surfaces in parallel with the y-axis of the upper frame portion 12b toward the other inner wall surface. Similarly, a plurality of (five in the present embodiment) bar-like partitions 12a1 (corresponding to the aforementioned "flow control portions) are arranged on the lower surface of the plane portion 12a, in parallel with the x-axis, at predetermined intervals along the y-axis, and in such a manner as to extend in a staggered manner from one of the two inner wall surfaces in parallel with the y-axis of the lower frame portion 12c toward the other inner wall surface. The vertical section (section taken along a plane in parallel with the y-z plane) of each of the partitions 12a1 has a generally rectangular shape (or generally square shape). The shape, etc. of the partition 12a1 will be described later in detail.

The upper frame portion 12b is a frame body provided around the plane portion 12a (in a region in the vicinity of the four sides of the plane portion 12a; i.e., an outer peripheral region of the plane portion 12a) in an upwardly projecting condition. The upper frame portion 12b consists of a perimetric frame portion 12b1 and a jutting portion 12b2.

The perimetric frame portion 12b1 is located on a side toward the perimeter of the support member 12. The vertical section of the perimetric frame portion 12b1 (e.g., a section of the perimetric frame portion 12b1 whose longitudinal direction coincides with the direction of the y-axis, taken along a plane parallel with the x-z plane) assumes a rectangular shape (or a square shape).

The jutting portion 12b2 juts toward the center of the support member 12 from the inner peripheral surface of the perimetric frame portion 12b1 at one of four corner portions of the plane portion 12a. The lower surface of the jutting portion 12b2 is integral with the plane portion 12a. The shape of the jutting portion 12b2 as viewed in plane is generally square. The height (length along the z-axis) of the jutting portion 12b2 is identical with the height of the perimetric frame portion 12b1. The jutting portion 12b2 has a through-hole TH formed therein. The through-hole TH also extends through a portion of the plane portion 12a which is located under the jutting portion 12b2.

The lower frame portion 12c is a frame body provided around the plane portion 12a (in a region in the vicinity of the four sides of the plane portion 12a; i.e., an outer peripheral region of the plane portion 12a) in a downwardly projecting condition. The lower frame portion 12c is symmetrical with the upper frame portion 12b with respect to a centerline CL which halves the thickness of the plane portion 12a. Accordingly, the lower frame portion 12c has a perimetric frame portion 12c1 and a jutting portion 12c2 which are identical in shape with the perimetric frame portion 12b1 and the jutting portion 12b2, respectively. However, the jutting portion 12c2 is formed at the plane portion 12*a* in such a manner as to be diagonally opposite the jutting portion 12*b*2 as viewed in plane.

Figure 4:
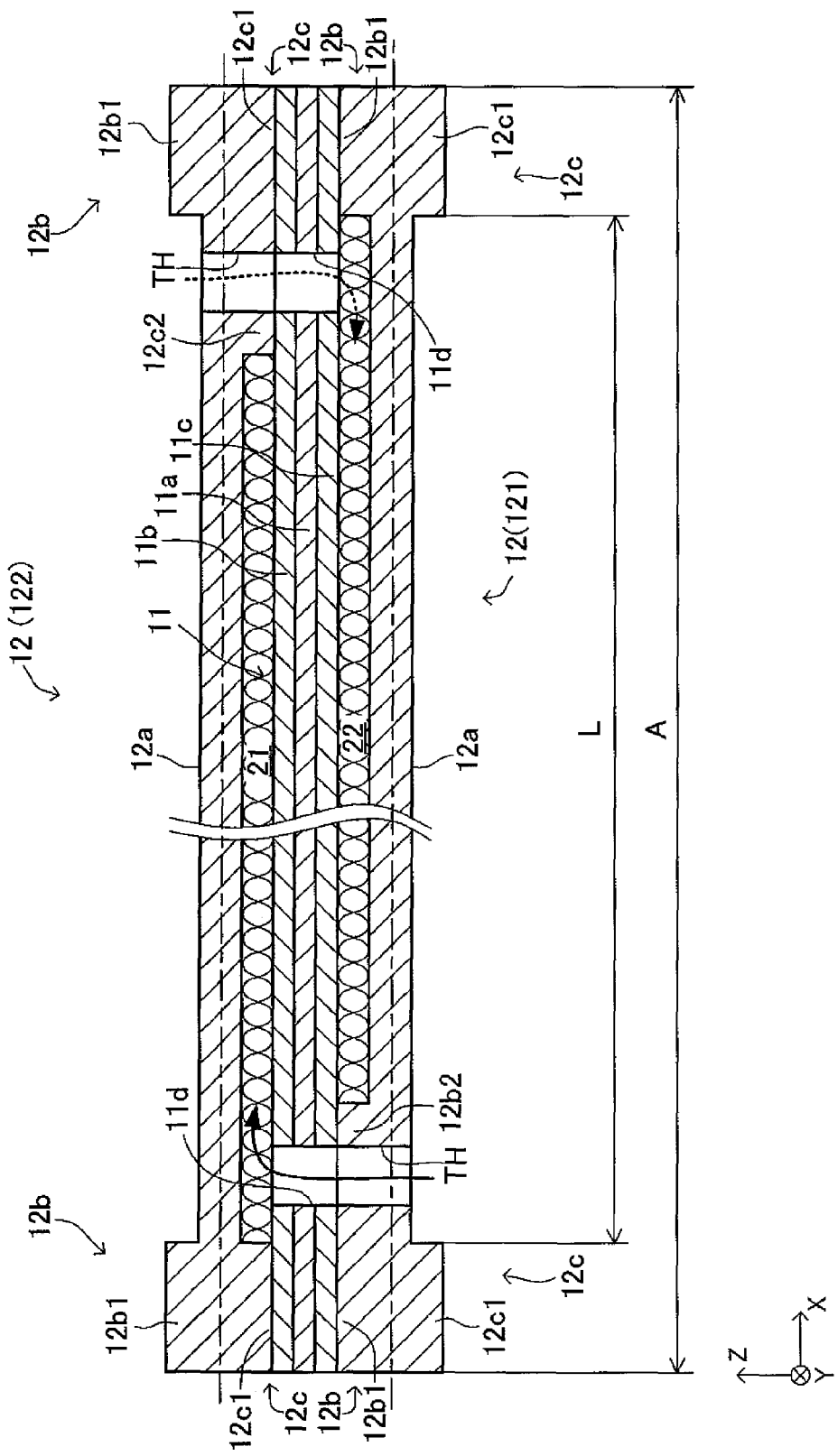
FIG. 4 is a vertical sectional view of a sheet body and a pair of support members in a state of supporting the sheet body therebetween as shown in FIG. 1, the sectional view being taken along a plane which includes line 2-2 of FIG. 2 and is in parallel with an x-z plane.

FIG. 4 is a vertical sectional view of the sheet body 11 and a pair of the support members 12 in a state of supporting (holding) the sheet body 11 therebetween, the sectional view being taken along a plane which includes line 2-2 of FIG. 2 parallel with the x-axis and is in parallel with the x-z plane. As mentioned previously, the fuel cell 10 is formed by stacking the sheet bodies 11 and the support members 12 in alternating layers.

For convenience of description, of the paired support members 12, the support member 12 adjacent to the lower side of the sheet body 11 is referred to as a lower support member 121, and the support member 12 adjacent to the upper side of the sheet body 11 is referred to as an upper support member 122. As shown in FIG. 4, the lower support member 121 and the upper support member 122 are coaxially arranged such that the lower frame portion 12*c* of the upper support member 122 is located above the upper frame portion 12*b* of the lower support member 121 in a mutually facing manner.

The entire perimetric portion of the sheet body 11 is sandwiched between the upper frame portion 12*b* of the lower support member 121 and the lower frame portion 12*c* of the upper support member 122. At this time, the sheet body 11 is arranged such that the air electrode layer 11*c* faces the upper surface of the plane portion 12*a* of the lower support member 121 and such that the fuel electrode layer 11*b* faces the lower surface of the plane portion 12*a* of the upper support member 122.

The lower surface of a perimetric portion of the sheet body 11 (i.e., the lower surface of a perimetric portion of the air electrode layer 11*c*) is in contact with the upper surface of the upper frame portion 12*b* of the lower support member 121 (specifically, the upper surface of the perimetric frame portion 12*b*1 and the upper surface of the jutting portion 12*b*2) and is fixedly bonded to the upper frame portion 12*b* by means of glass or the like. Similarly, the upper surface of a perimetric portion of the sheet body 11 (i.e., the upper surface of a perimetric portion of the fuel electrode layer 11*b*) is in contact with the lower surface of the lower frame portion 12*c* of the upper support member 122 (specifically, the lower surface of the perimetric frame portion 12*c*1 and the lower surface of the jutting portion 12*c*2) and is fixedly bonded to the lower frame portion 12*c* by means of glass or the like.

In other words, the upper and lower surfaces of the entire perimetric portion of the sheet body 11 are fixedly bonded to the lower frame portion 12*c* of the upper support member 122 and the upper frame portion 12*b* of the lower support member 121, respectively. In this connection, the sheet body 11 may be fixedly bonded to the support members 12 such that the sheet body 11 is completely immovable in relation to the support members 12 or such that, only at a certain temperature or higher, the sheet body 11 is movable to a certain extent in relation to the support members 12.

Thus, as shown in FIG. 4, the lower surface of the plane portion 12*a* of the upper support member 122, the inner wall surface of the lower frame portion 12*c* (the perimetric frame portion 12*c*1 and the jutting portion 12*c*2) of the upper support member 122, and the upper surface of the fuel electrode layer 11*b* of the sheet body 11 define a first space 21 through which a fuel gas that contains hydrogen flows. As indicated by the solid-line arrow of FIG. 4, the fuel gas flows into the first space 21 through the through-hole TH of the lower support member 121 and the cell through-hole 11*d* of the sheet body 11 (the through-hole TH and the cell through-hole 11*d* collectively correspond to the aforementioned "inlet"). After entering the first space 21 the fuel gas flows out from the first space 21 through the through-hole TH of the upper support member 122 (the through-hole TH corresponds to the aforementioned "outlet").

Also, the upper surface of the plane portion 12*a* of the lower support member 121, the inner wall surface of the upper frame portion 12*b* (the perimetric frame portion 12*b*1 and the jutting portion 12*b*2) of the lower support member 121, and the lower surface of the air electrode layer 11*c* of the sheet body 11 define a second space 22 through which a gas that contains oxygen (in the present embodiment, the gas is air) flows. As indicated by the broken-line arrow of FIG. 4, air flows into the second space 22 through the through-hole TH of the upper support member 122 and the cell through-hole 11*d* of the sheet body 11 (the through-hole TH and the cell through-hole 11*d* collectively correspond to the aforementioned "inlet"). After entering the second space 22, air flows out from the second space 22 through the through-hole TH of the lower support member 121 (the through-hole TH corresponds to the aforementioned "outlet").

As shown in FIG. 4, a current-collecting metal mesh is confined in each of the first space 21 and the second space 22. The metal mesh is, for example, an embossed (unilaterally embossed or bilaterally embossed) metal mesh. Through employment of the metal meshes, in the fuel cell 10, electrical connection is established in the stacking direction. In addition to a plain weave mesh, an expanded metal, a punched metal, or the like can be used to form the metal mesh. Various forms, such as projections, can be imparted to the metal mesh by die working or the like.

One side of the planar shape (square shape) of the sheet body 11 (and the support member 12) has a length A of, in the present embodiment, 5 mm to 200 mm inclusive. The thickness t of the sheet body 11 is distributed uniformly throughout the sheet body 11 and is, in the present embodiment, 20 $\mu$m to 500 $\mu$m inclusive. The electrolyte layer 11*a*, the fuel electrode layer 11*b*, and the air electrode layer 11*c* have thicknesses of, for example, 1 $\mu$m to 50 $\mu$m inclusive, 5 $\mu$m to 500 $\mu$m inclusive, and 5 $\mu$m to 200 $\mu$m inclusive, respectively.

Figure 5:
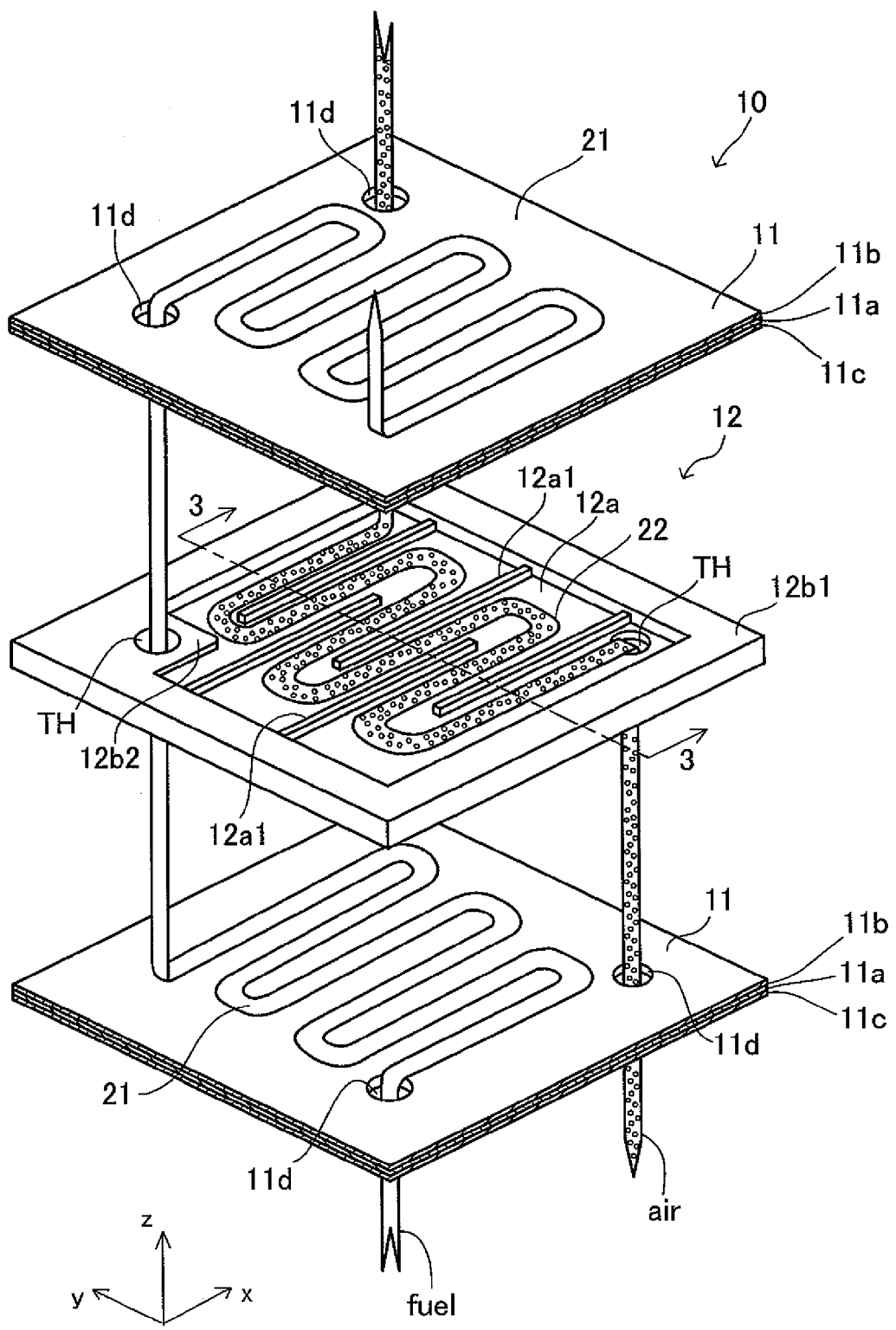
FIG. 5 is a view for explaining flow of a fuel gas and air in the fuel cell shown in FIG. 1.

In the thus-configured fuel cell 10, as shown in FIG. 5, the partitions 12*a*1 control the flow channels for the fuel gas and air in the first and second spaces 21 and 22, respectively; as a result, the fuel gas and air flow primarily in a meandering manner. In this state, electricity is generated according to Chemical Reaction Formulas (1) and (2) shown below.

$$(\tfrac{1}{2}).O_2 + 2e^- \rightarrow O^{2-} \text{ (at air electrode layer 11}c) \tag{1}$$

$$H_2 + O^{2-} \rightarrow H_2O + 2e^- \text{ (at fuel electrode layer 11}b) \tag{2}$$

The thus-configured fuel cell 10 generates electricity while utilizing the chemical reactions expressed above by Formulas (1) and (2). However, since the fuel cell 10 utilizes oxygen conductivity of the solid electrolyte layer 11*a* for generating electricity, the working temperature of the fuel cell 10 is generally 600° C. or higher. Accordingly, the temperature of the fuel cell 10 is raised from room temperature to the working temperature (e.g., 800° C.) by means of an external heating mechanism (e.g., a heating mechanism which uses a resistance heater or a heating mechanism which utilizes heat generated through combustion of a fuel gas).

Figure 6:
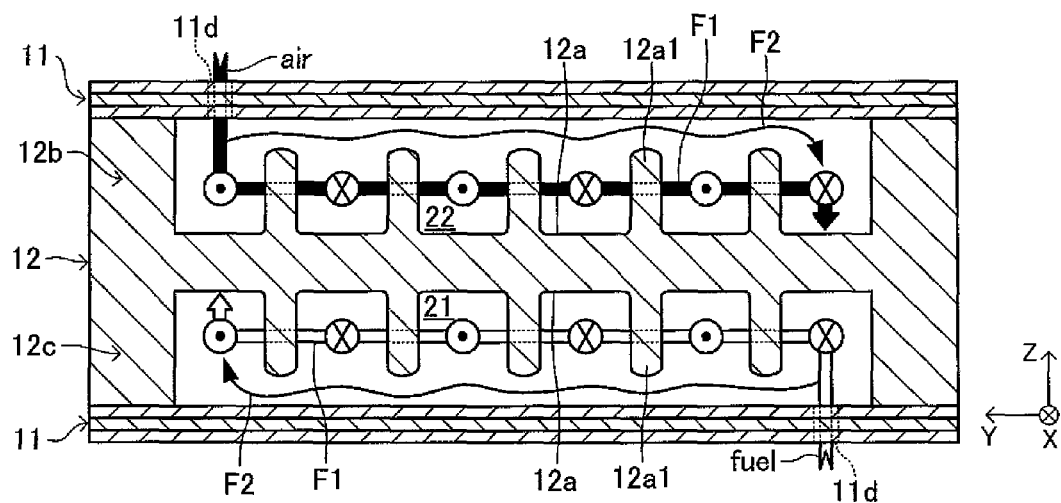
FIG. 6 is a schematic, vertical sectional view of the support member and a pair of sheet bodies in a state of sandwiching the support member therebetween as shown in FIG. 1, the sectional view being taken along a plane which includes line 3-3 of FIG. 2 or 5 and which is in parallel with a y-z plane.
Figure 7:
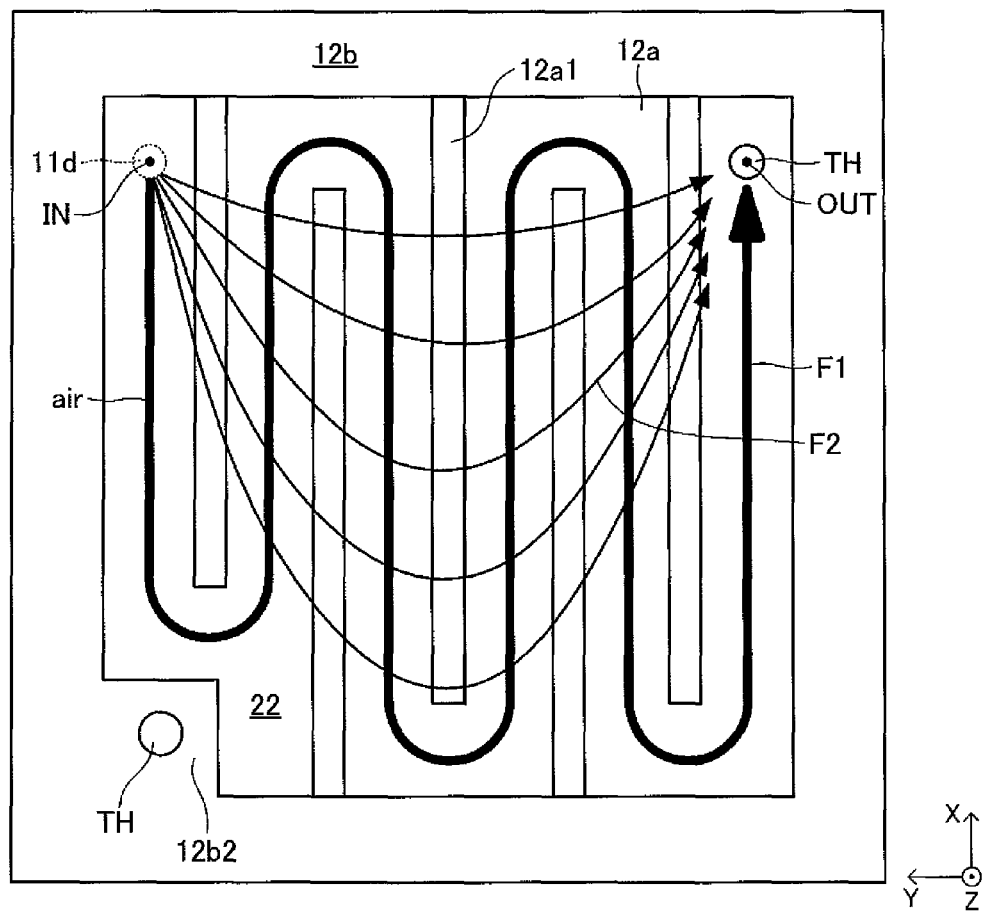
FIG. 7 is a plan view of the assembly of FIG. 6 with the upper sheet body removed.

Partition 12*a*1:

Next, the partitions 12*a*1 will be described. FIG. 6 is a schematic, vertical sectional view of the support member 12 and a pair of sheet bodies 11 in a state of sandwiching the support member 12 therebetween, the sectional view being taken along a plane which includes line 3-3 in parallel with the y-axis in FIG. 2 or 5 and which is in parallel with the y-z plane. The line 3-3 passes through the center of the planar shape (square shape) of the support member 12 (the center of the planar shape (square shape) of the sheet body 11). FIG. 7 is a plan view of the assembly of FIG. 6 with the upper sheet body 11 removed.

The support member 12 shown in FIG. 6 is the upper support member 122 as viewed from the lower sheet body 11 and is the lower support member 121 as viewed from the upper sheet body 11. The flow of air flowing through the second space 22 will be described below. The description of the flow of air is applicable to the flow of the fuel gas flowing through the first space 21. For convenience of description, the sheet bodies 11 are considered to be undeformed.

As shown in FIGS. 6 and 7, air is introduced into the second space 22 through an inlet IN (specifically, the cell through-hole 11d formed in the upper sheet body 11 of FIG. 6) and flows out from the second space 22 through an outlet OUT (specifically, the through-hole TH formed in the support member 12 (lower support member 121) of FIG. 6). If the partitions 12a1 are not provided, air tends to flow along the thin-line arrows (equivalent to a second flow F2 to be described later) shown in FIG. 7 such that the flow channels become as short as possible. In this case, since air does not reach every corner of the second space 22, the aforementioned "flow area" becomes relatively small. As a result, electricity-generating reactions cannot efficiently occur in the sheet bodies 11.

In order to cope with the above problem, in the present embodiment, the above-mentioned partitions 12a1 are provided for controlling the flow channel so as to increase the "flow area." By virtue of this, the flow of air (see the thick-line arrows shown in FIGS. 6 and 7; hereinafter, referred to as the "first flow F1") which, as viewed in plane, meanders along the partitions 12a1 in the second space 22, is generated. The generation of the first flow F1 increases the "flow area," thereby accelerating electricity-generating reactions in the sheet bodies 11 (the aforementioned "flow-control-portion-induced reaction acceleration effect").

Figure 8:
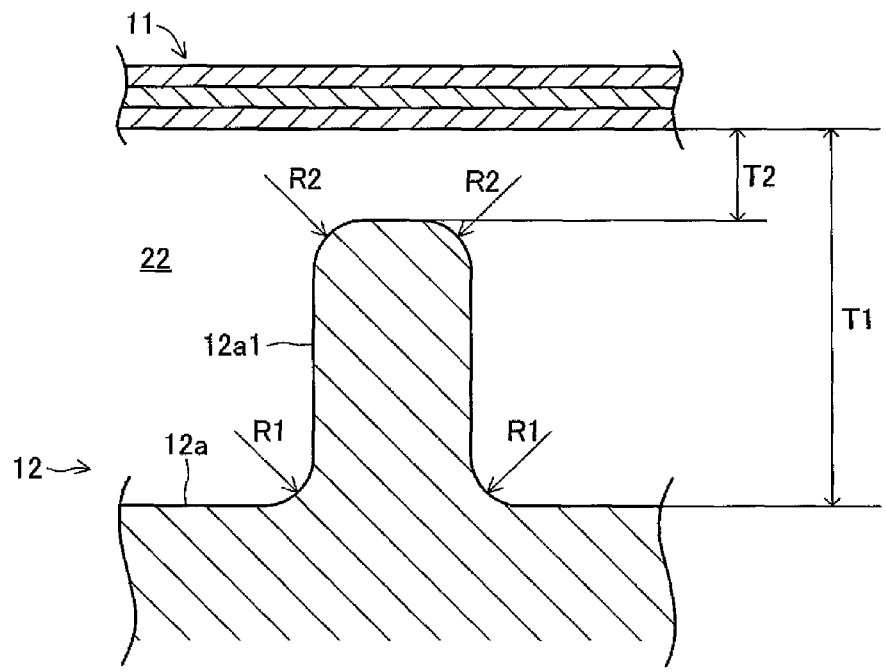
FIG. 8 is a schematic view showing, on an enlarged scale, a single partition and its periphery shown in FIG. 6.

As shown in FIG. 8, with respect to a direction (vertical direction in FIG. 8) perpendicular to a planar direction of the sheet body 11, the distance (corresponding to the aforementioned "first distance") between the upper surface of the plane portion 12a of the support member 12 and the lower surface of the sheet body 11 which faces the upper surface is referred to as the "height T1 of the second space 22"; the distance (corresponding to the aforementioned "second distance") between the lower surface of the sheet body 11 and the projecting end of the partition 12a1 is referred to as the "gap T2"; and the ratio "T2/T1" is referred to as the "gap ratio."

When the gap ratio T2/T1 is 0 (i.e., gap T2=0), air cannot come into contact with the sheet body 11 at least in a region where the partitions 12a1 are present as viewed in plane; thus, the region cannot be a part of the "flow area." As a result, the provision of the partitions 12a1 fails to sufficiently yield the "flow-control-portion-induced reaction acceleration effect."

By contrast, in the present embodiment, as shown in FIGS. 6 and 8, the gap ratio T2/T1 is greater than 0 (i.e., gap T2>0). Thus, in addition to the first flow F1, the second flow F2 is generated (see the thin-line arrows shown in FIGS. 6 and 7). The second flow F2 flows over the partitions 12a1 and through the gap and flows along as short a flow channel as possible.

By virtue of the generation of the second flow F2, the region where the partitions 12a1 are present as viewed in plane becomes a part of the "flow area." Since the second flow F2 flows through the gap, the second flow F2 flows particularly in the vicinity of the lower surface of the sheet body 11 in the second space 22. Thus, the second flow F2 can aid the supply of air (oxygen) into the air electrode layer 11c (porous electrode layer) of the sheet body 11. As a result, the generation of the second flow F2 in addition to the first flow F1 further accelerates electricity-generating reactions in the sheet bodies 11 (the aforementioned "gap-induced reaction acceleration effect").

Next will be described the optimum range of the gap ratio T2/T1 (>0) and that of the gap T2 (>0). Generally, the intensity of the "flow-control-portion-induced reaction acceleration effect" tends to increase with the velocity of the first flow F1, and the intensity of the "gap-induced reaction acceleration effect" tends to increase with the velocity of the second flow F2.

Figure 9:
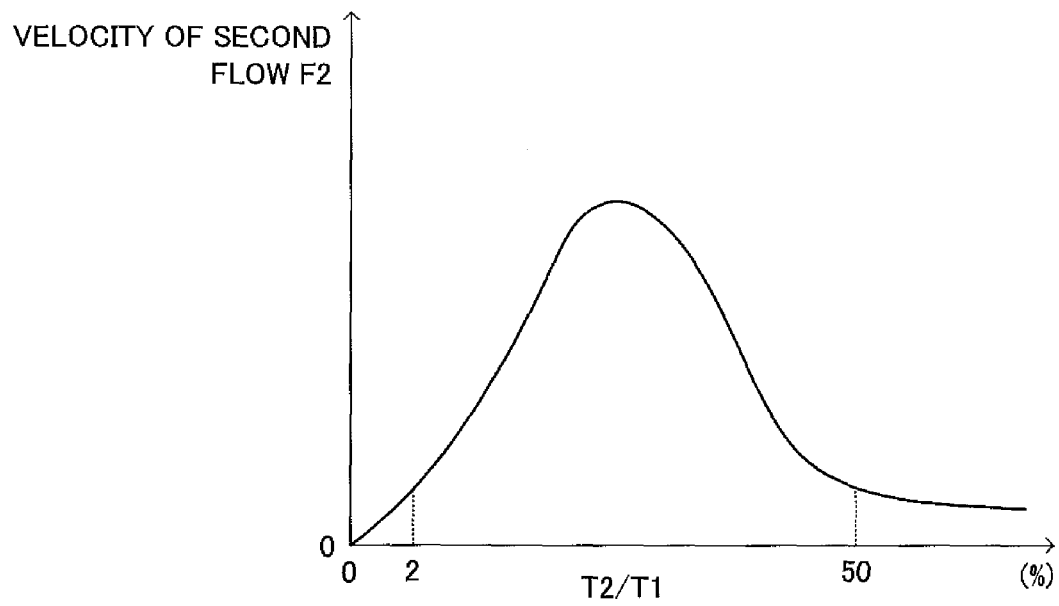
FIG. 9 is a graph showing the relation between the ratio "gap/space height" and the velocity of the second flow.

In view of the above, preferably, the gap ratio T2/T1 falls within the range of 2% to 50% inclusive. The reason for this is as follows. As shown in FIG. 9, our studies have revealed that, when the gap ratio T2/T1 is less than 2% or in excess of 50%, the velocity of the second flow F2 becomes significantly low, so that the "gap-induced reaction acceleration effect" cannot be sufficiently yielded. Additionally, our studies have revealed that, when the gap ratio T2/T1 is in excess of 50%, the percentage of the first flow F1 with respect to the flow of air flowing through the second space 22 reduces significantly, so that the velocity of the first flow F1 drops significantly; therefore, the "flow-control-portion-induced reaction acceleration effect" cannot be sufficiently yielded. The experimental results indicative of the above phenomena will next be described with reference to Table 1.

TABLE 1

| Level | Space height (T1) μm | Gap (T2) μm | Gap ratio (T2/T1) % | Output density mW/cm$^2$ |
|---|---|---|---|---|
| 1 | 400 | 0 | 0.0 | 422 |
| 2 | 400 | 8 | 2.0 | 553 |
| 3 | 400 | 50 | 12.5 | 615 |
| 4 | 400 | 100 | 25.0 | 620 |
| 5 | 400 | 200 | 50.0 | 607 |
| 6 | 400 | 250 | 62.5 | 432 |
| 7 | 400 | 300 | 75.0 | 415 |

Table 1 shows the results of the experiment in which the output density (mW/cm$^2$) of the fuel cell 10 was measured for individual combinations of the height T1 and the gap T2 which were established by changing the gap T2 with the height T1 fixed to 400 μm (accordingly, by changing the gap ratio T2/T1). Major conditions of the experiment are as follows.

Number of cells of stack: 1 (a pair of support members 12 and one sheet body 11 sandwiched therebetween)

Shape of stack as viewed in plane: square with 30 mm on sides

Thickness of each layer of sheet body: electrolyte layer 11a: 3 μm; fuel electrode layer 11b: 100 μm; air electrode layer 11c: 5 μm Electricity-generating temperature: 800° C.

Gas supply flow rate: 300 sccm for each of hydrogen gas and air

Schematic shape of partition 12a1: as shown in FIGS. 2, 5, and 6

As shown in Table 1, as compared with the case where the gap ratio T2/T1 falls within the range of 2% to 50% inclusive, when the gap ratio T2/T1 is less than 2% or in excess of 50%, a significant drop in output density is observed (particularly, levels 1, 6, and 7). Conceivably, such a drop in output density is caused by a failure to effectively yield the aforementioned "flow-control-portion-induced reaction acceleration effect" and "gap-induced reaction acceleration effect." Table 1 shows the experimental results only for the case where the height T1 is fixed to 400 μm. However, our studies have confirmed that a similar tendency is shown at least when the height T1 falls within the range of 50 μm to 1,000 μm inclusive.

Thus, when the gap ratio T2/T1 falls within the range of 2% to 50% inclusive, the "flow-control-portion-induced reaction acceleration effect" associated with the first flow F1 can be stably yielded, and additionally, the "gap-induced reaction acceleration effect" associated with the second flow F2 can be effectively yielded. Therefore, electricity-generating reactions in the sheet bodies 11 can be effectively accelerated.

Additionally, it is preferred to set the gap T2 to 20 μm or more. Regardless of the gap ratio T2/T1, when the gap T2 is less than 20 μm, the velocity of the second flow F2 drops significantly. As a result, the "gap-induced reaction acceleration effect" cannot be sufficiently yielded, as supported by the experimental results which will be described below with reference to Table 2.

TABLE 2

| Level | Space height (T1) μm | Gap (T2) μm | Gap ratio (T2/T1) % | Output density mW/cm$^2$ |
|---|---|---|---|---|
| 1 | 200 | 0 | 0.0 | 415 |
| 2 | 200 | 10 | 5.0 | 422 |
| 3 | 200 | 20 | 10.0 | 575 |
| 4 | 200 | 30 | 15.0 | 620 |
| 5 | 350 | 0 | 0.0 | 432 |
| 6 | 350 | 15 | 4.3 | 408 |
| 7 | 350 | 20 | 5.7 | 595 |
| 8 | 350 | 30 | 8.6 | 588 |
| 9 | 500 | 0 | 0.0 | 445 |
| 10 | 500 | 10 | 2.0 | 465 |
| 11 | 500 | 20 | 4.0 | 608 |
| 12 | 850 | 0 | 0.0 | 395 |
| 13 | 850 | 15 | 1.8 | 412 |
| 14 | 850 | 20 | 2.4 | 613 |
| 15 | 850 | 40 | 4.7 | 607 |

Table 2 shows the results of the experiment in which the output density (mW/cm$^2$) of the fuel cell 10 was measured for individual combinations of the height T1 and the gap T2 (accordingly, for individual gap ratios T2/T1). Major conditions of the experiment are as mentioned above.

As shown in Table 2, if the gap T2 is less than 20 μm, even when the gap ratio T2/T1 falls within the range of 2% to 50% inclusive (regardless of the gap ratio T2/T1), a significant drop in output density is observed (particularly, levels 2, 6, and 10). Conceivably, such a drop in output density is caused by a failure to effectively yield the aforementioned "gap-induced reaction acceleration effect."

Thus, in order to effectively accelerate electricity-generating reactions in the sheet bodies 11, it is preferred to set the gap T2 to 20 μm or more, while setting the gap ratio T2/T1 to fall within the range of 2% to 50% inclusive.

Next, the minimum radius of curvature of the partition 12a1 will be described. In the present embodiment, the height T1 of the second space 22 is 50 μm to 1,000 μm. In this case, preferably, the minimum radius of curvature on the outer surface of the partition 12a1 is 20 μm or more. Specifically, in the present embodiment, the partition 12a1 whose vertical section has a rectangular shape is radiused at a root portion and a projecting end portion thereof. Preferably, in the vertical section (a section taken along a plane in parallel with the y-z plane) of the partition 12a1 shown in FIG. 8, the radius R1 or R2, whichever smaller, is 20 μm or more.

By means of radiusing the root portion of the partition 12a1, air is unlikely to stagnate at the root portion. Also, by means of radiusing the projecting end portion of the partition 12a1, air vortexes are unlikely to be generated at the projecting end portion. Additionally, when the height T1 falls within the range of 50 μm to 1,000 μm inclusive, through setting the above-mentioned minimum radius of curvature to 20 μm or more, the above-mentioned generation of "air stagnation" and "air vortexes" can be effectively restrained, as supported by the experimental results which will be described below with reference to Table 3.

TABLE 3

| Level | Space height (T1) μm | Gap (T2) μm | Radius of curvature at partition end μm | Output density mW/cm$^2$ |
|---|---|---|---|---|
| 1 | 400 | 50 | 0 (right angle) | 615 |
| 2 | 400 | 50 | 10 | 608 |
| 3 | 400 | 50 | 20 | 685 |
| 4 | 400 | 50 | 30 | 672 |
| 5 | 400 | 50 | 50 | 678 |
| 6 | 600 | 30 | 0 (right angle) | 598 |
| 7 | 600 | 30 | 10 | 610 |
| 8 | 600 | 30 | 20 | 675 |
| 9 | 600 | 30 | 30 | 696 |
| 10 | 600 | 30 | 50 | 684 |

Table 3 shows the results of the experiment in which the output density (mW/cm$^2$) of the fuel cell 10 was measured while the radius of radiusing (R1=R2) was varied for each of predetermined combinations of the height T1 and the gap T2. Major conditions of the experiment are as mentioned above. A shape whose radius (R1=R2) is 0 (right angel; i.e., not radiused) was formed by machining. A shape whose radius (R1=R2) is greater than 0 was formed by etching while etching conditions were regulated as appropriate.

As shown in Table 3, when the radius of radiusing (R1=R2) is less than 20 μm, a significant drop in output density is observed (particularly, levels 1, 2, 6, and 7). Conceivably, such a drop in output density is caused by marked generation of "air stagnation" and "air vortexes" mentioned above.

Thus, in order to effectively restrain the generation of "air stagnation" and "air vortexes" mentioned above, preferably, the minimum radius of curvature on the outer surface of the partition 12a1 is 20 μm or more. Through employment of such a radius, air corresponding to the second flow F2 can flow smoothly over the partitions 12a1. As a result, a drop in the velocity of the second flow F2, which drop occurs due to presence of the partitions 12a1 over which air flows, is suppressed, whereby the "gap-induced reaction acceleration effect" associated with the second flow F2 can be yielded more effectively.

As in the case of the present embodiment, at a high temperature equivalent to the working temperature of the solid oxide fuel cell, the viscosity of air increases greatly; thus, air tends to encounter difficulty in flowing over the partitions 12a1. Therefore, setting a lower limit to the minimum radius of curvature for the partitions 12a1 as mentioned above is particularly effective for, for example, the solid oxide fuel cell, which is used at high temperature.

The above description assumes that the sheet body 11 is not deformed. However, in actuality, the sheet body 11 is very thin. Additionally, when the sheet body 11 is raised in temperature from room temperature to the working temperature, a difference in thermal expansion coefficient among the above-mentioned three layers used to form the sheet body 11 readily causes a deformation of a central portion of the sheet body 11 along the vertical direction (a direction perpendicular to the planar direction).

Figure 10:
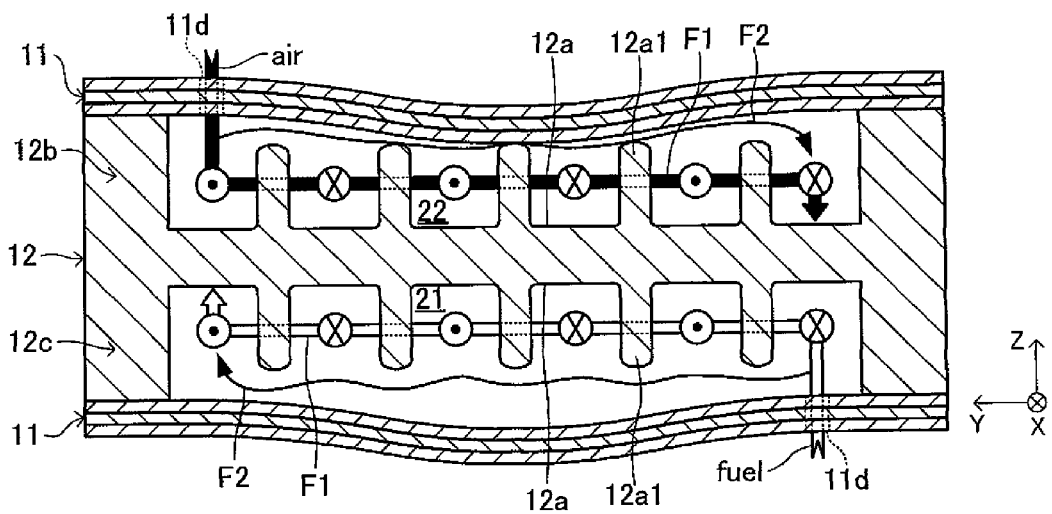
FIG. 10 is a schematic view corresponding to FIG. 6, showing a state where central portions of the sheet bodies are deformed.

For example, in FIG. 10, a central portion of the sheet body 11 is deformed (warped) downward and is in contact with projecting ends of the partitions 12a1 (of the lower support member 121). In this manner, when a central portion of the sheet body 11 is deformed in the vertical direction, the height T1 of the second space 22 and the gap T2 also vary according to a position on the sheet body 11 as viewed in plane.

In the present embodiment, the height T1 of the second space 22 and the gap T2 are measured at positions which correspond to the partitions 12a1 as viewed in plane, in a state of use where the fuel cell 10 is raised in temperature to the working temperature (in consideration of deformation of the sheet body 11). In the case where a plurality of the partitions 12a1 are provided as in the case of the present embodiment, it suffices that the gap ratio T2/T1 associated with at least a single partition 12a1 falls within the range of 2% to 50% inclusive, and it suffices that the gap T2 associated with at least a single partition 12a1 is 20 μm or more.

Next, an example method for manufacturing the fuel cell 10 will be briefly described. First, the sheet body 11 of, for example, an electrolyte-support-type (the electrolyte layer serves as a support substrate) is formed as follows. A sheet (which is to become the fuel electrode layer 11b) is formed by a printing process on the upper surface of a ceramic sheet (YSZ tape) prepared by a green sheet process; the resultant laminate is fired at 1,400° C. for one hour; a sheet (which is to become the air electrode layer 11c) is formed similarly by a printing process on the lower surface of the resultant fired body; and the resultant laminate is fired at 1,200° C. for one hour.

The sheet body 11 of a fuel-electrode-support-type (the fuel electrode layer serves as a support substrate) is formed as follows. A ceramic sheet (YSZ tape) prepared by a green sheet process is laminated on the lower surface of a sheet (which is to become the fuel electrode layer 11b); the resultant laminate is fired at 1,400° C. for one hour; a sheet (which is to become the air electrode layer 11c) is formed by a printing process on the lower surface of the resultant fired body; and the resultant laminate is fired at 850° C. for one hour. In this case, the sheet body 11 may be formed as follows: a ceramic sheet is formed by a printing process on the lower surface of a sheet (which is to become the fuel electrode layer 11b); the resultant laminate is fired at 1,400° C. for one hour; a sheet (which is to become the air electrode layer 11c) is formed by a printing process on the lower surface of the resultant fired body; and the resultant laminate is fired at 850° C. for one hour.

A portion of the support member 12 other than the partitions 12a1 can be formed by cutting or a like process. The partitions 12a1 are formed on the plane of the plane portion 12a by etching or a like process.

Next, a predetermined sealing material (e.g., borosilicate glass) is applied by a printing process to those perimetric portions of the support members 12 which are to hold the sheet body 11 therebetween (i.e., the lower surface of the lower frame portion 12c and the upper surface of the upper frame portion 12b). Next, the support members 12 and the sheet bodies 11 are stacked in alternating layers, followed by heat treatment (800° C. for one hour) for integration of the layers into a stack structure. Subsequently, a predetermined sealing material (borosilicate-base crystallized glass or the like) is applied to the side wall of the stack structure, followed by heat treatment (e.g., 850° C. for one hour) for reinforcement. The fuel cell 10 is thus completed.

As described above, the solid oxide fuel cell 10 according to the embodiment of the present invention has a stack structure in which the sheet bodies 11 and the support members 12 are stacked in alternating layers. The spaces 21 and 22, through which the fuel gas and air flow respectively, are formed on opposite sides of the support member 12 between the support member 12 and the sheet bodies 11 adjacent to the support member 12. The partitions 12a1 provided on the support member 12 project into the spaces 21 and 22. Thus is formed the "first flow F1," which is a flow of gas that is controlled by the partitions 12a1. The height of the partition 12a1 is lower than the height T1 of the space, so that the gap T2 (>0) is formed at the projecting end of the partition 12a1. Thus, the "second flow F2" of gas which flows over the partitions 12a1 through the gaps is generated.

The ratio "gap T2/space height T1" is set to 2% to 50% inclusive, and the gap T2 is set to 20 μm or more. By virtue of this, the "flow-control-portion-induced reaction acceleration effect" associated with the first flow F1 can be stably yielded, and additionally, the "gap-induced reaction acceleration effect" associated with the second flow F2 can be effectively yielded. Therefore, electricity-generating reactions in the sheet bodies 11 can be effectively accelerated.

The present invention is not limited to the above-described embodiment and modifications, but can be modified in various other forms without departing from the scope of the present invention. For example, in the above-described embodiment, the partitions 12a1 are provided on both the upper surface and the lower surface of the plane portion 12a of the support member 12. However, the partitions 12a1 may be provided merely on either the upper surface or the lower surface of the plane portion 12a.

Figure 11:
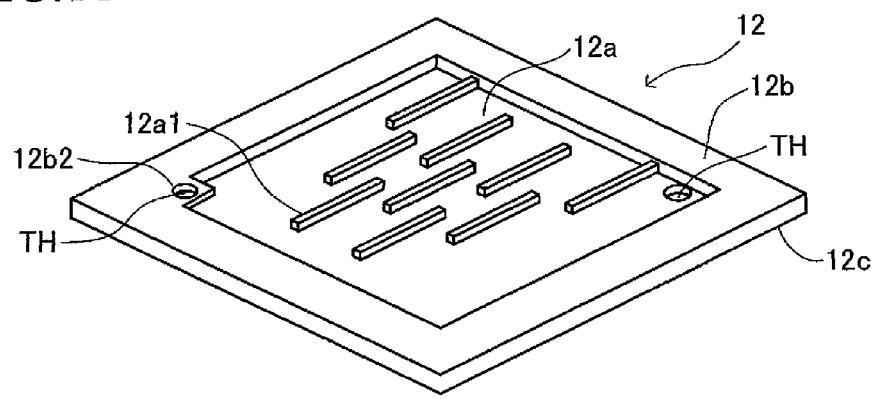
FIG. 11 is a perspective view of a support member having flow control portions according to a modification of the embodiment of the present invention.
Figure 12:
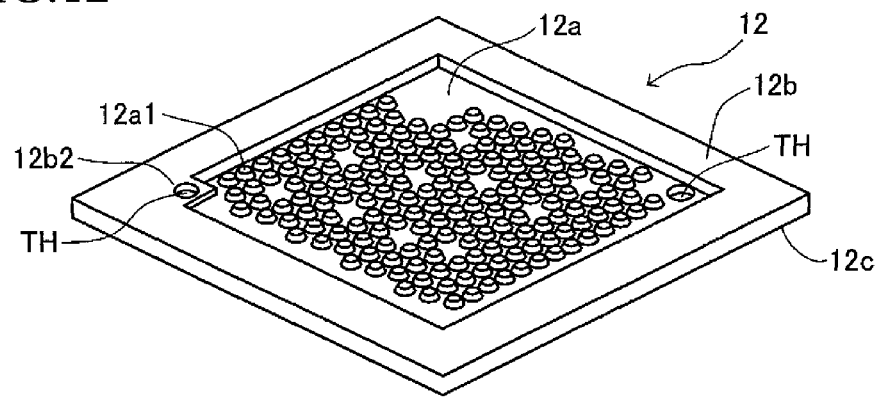
FIG. 12 is a perspective view of a support member having flow control portions according to another modification of the embodiment of the present invention.

In the present embodiment, a plurality of bar-like partitions 12a1 are formed and arranged as shown in FIG. 2 and other drawings so as to serve as the "flow control portions." However, a plurality of bar-like partitions 12a1 may be formed and arranged as shown in FIG. 11 so as to serve as the "flow control portions." Additionally, as shown in FIG. 12, a plurality of protrusions 12a1 may be formed and arranged so as to serve as the "flow control portions." These forms of the "flow control portions" can also increase the flow area, thereby yielding "flow-control-portion-induced reaction acceleration effect."

Figure 13:
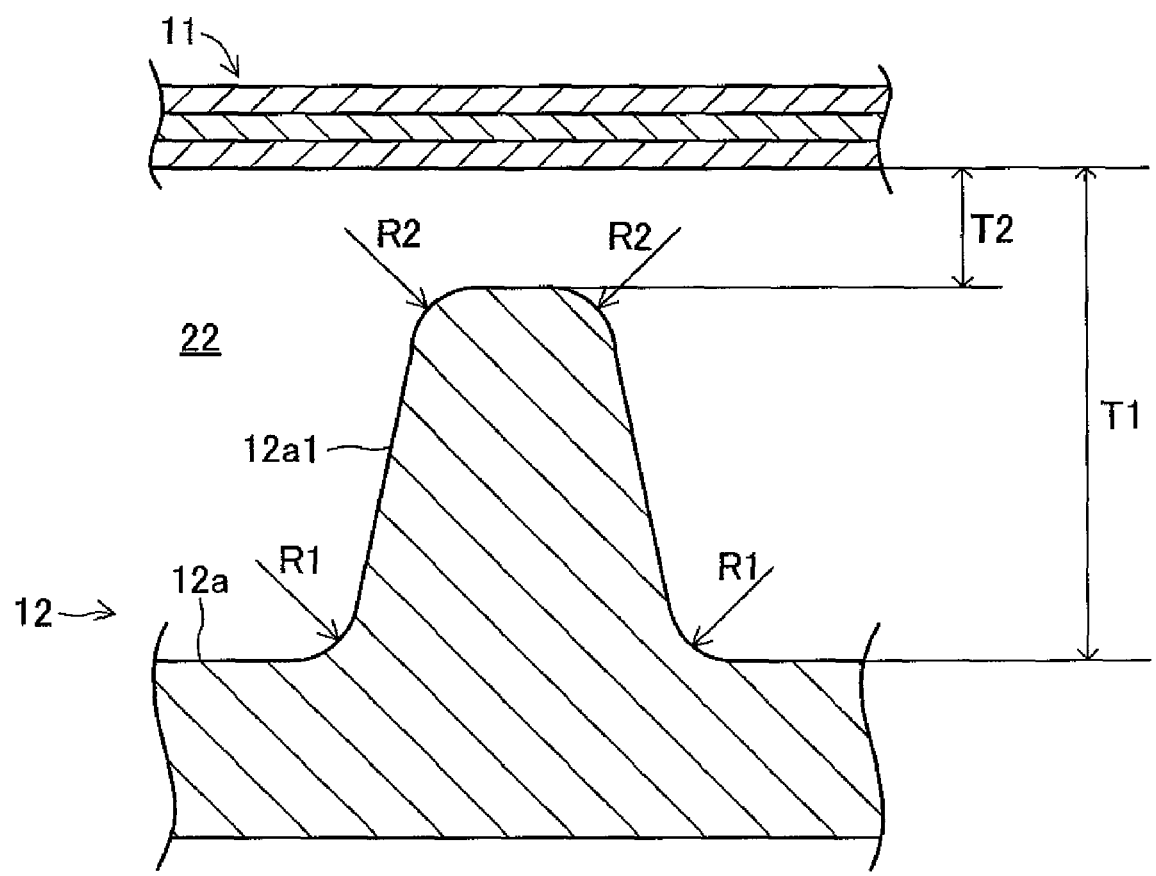
FIG. 13 is a schematic view showing, on an enlarged scale, a single partition and its periphery according to a further modification of the embodiment of the present invention.

In the above-described embodiment, the partition 12a1 whose vertical section has a rectangular shape is radiused at a root portion and a projecting end portion thereof (see FIG. 8). However, as shown in FIG. 13, the partition 12a1 whose vertical section has such a trapezoidal shape (tapered shape) as to be narrowed toward its projecting end may be radiused at a root portion and a projecting end portion thereof. According to the findings of our studies, through employment of such the partition 12a1, air associated with the second flow F2 can flow over the partitions 12a1 more smoothly, and a drop in the velocity of the second flow F2 can be restrained, whereby the "gap-induced reaction acceleration effect" associated with the second flow F2 can be yielded more effectively.

The above-described embodiment employs a plurality of bar-like partitions 12a1 as the "flow control portions." However, the partitions 12a1 may be eliminated. Instead, the aforementioned metal meshes confined in the first and second spaces 21 and 22 may be employed as the "flow control portions." Since the confinement of the metal mesh controls the flow channel of gas, the practically effective flow area can be increased. That is, the metal mesh can also function as the "flow control portion."

Figure 14:
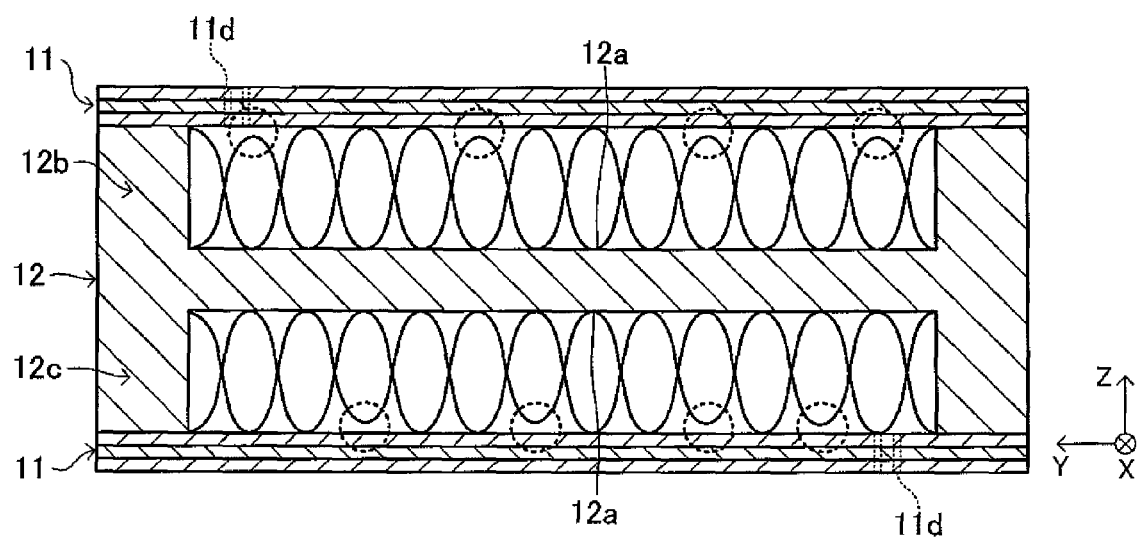
FIG. 14 is a view corresponding to FIG. 6, showing a case where metal meshes are used as flow control portions according to still another modification of the embodiment of the present invention.

In this case, as shown in FIG. 14, the metal mesh is arranged and configured such that all of a plurality of projections (protrusions which are to come into contact with the plane portion 12a) projecting toward the plane portion 12a of the support member 12 are in contact with the plane portion 12a. The projecting ends of the projections are bonded to the plane portion 12a by use of an electrically conductive paste or the like.

The metal mesh is also arranged and configured such that a part of the projections (protrusions which are to come into contact with the sheet body 11) projecting toward the sheet body 11 are in contact with the sheet body 11, whereas the remaining projections (marked with circles of the broken line in FIG. 14) are not in contact with the sheet body 11. The projecting ends of the part of the projections are bonded to the sheet body 11 by use of an electrically conductive paste or the like. The distance between the sheet body 11 and the projecting ends of the remaining projections corresponds to the aforementioned "gap T2."

When the metal mesh is arranged and configured as mentioned above, by means of the part of the projections projecting toward the sheet body 11 being in contact with the sheet body 11, an electrical connection is ensured between the support member 12 and the sheet body 11. Additionally, if the gap ratio T2/T1 associated with at least one of the above-mentioned remaining projections projecting toward the sheet body 11 falls within the range of 2% to 50% inclusive, as mentioned previously, the "flow-control-portion-induced reaction acceleration effect" associated with the first flow F1 can be stably yielded, and additionally, the "gap-induced reaction acceleration effect" associated with the second flow F2 can be effectively yielded.

Further, if the gap T2 associated with at least one of the remaining projections projecting toward the sheet body 11 is 20 μm or more, as mentioned previously, the "gap-induced reaction acceleration effect" can be sufficiently yielded.

In the above-described embodiment, the fuel electrode layer 11b can be formed from, for example, platinum, platinum-zirconia cermet, platinum-cerium-oxide cermet, ruthenium, or ruthenium-zirconia cermet.

Also, the air electrode layer 11c can be formed from, for example, lanthanum-containing perovskite-type complex oxide (e.g., lanthanum manganite or lanthanum cobaltite). Lanthanum cobaltite and lanthanum manganite may be doped with strontium, calcium, chromium, cobalt (in the case of lanthanum manganite), iron, nickel, aluminum, or the like. Also, the air electrode layer 11c may be formed from palladium, platinum, ruthenium, platinum-zirconia cermet, palladium-zirconia cermet, ruthenium-zirconia cermet, platinum-cerium-oxide cermet, palladium-cerium-oxide cermet, or ruthenium-cerium-oxide cermet.

In the above-described embodiment, the sheet body 11 and the support member 12 have a planar shape of square. However, the sheet body 11 and the support member 12 may have a planar shape of rectangle, circle, ellipse, etc.

Additionally, the above embodiment is described while mentioning the solid oxide fuel cell (SOFC) as a reactor. However, the reactor may be a ceramic reactor; for example, an exhaust-gas purification reactor.

What is claimed is:

1. A reactor comprising:
   a single or a plurality of sheet bodies which contain at least ceramic and in which chemical reactions occur, and
   a plurality of support members for supporting the single or the plurality of sheet bodies, each support member having a plane portion, and a frame portion provided along the entire perimeter of the plane portion and thicker than the plane portion,
   the reactor being configured such that the single or the plurality of sheet bodies and the plurality of support members are stacked in alternating layers,
   each of the sheet bodies is held between an upper support member, which is the support member adjacent to and located above the sheet body, and a lower support member, which is the support member adjacent to and located below the sheet body, in such a manner that a perimetric portion of the sheet body is sandwiched between the frame portion of the upper support member and the frame portion of the lower support member, whereby a lower surface of the plane portion of the upper support member, an inner wall surface of the frame portion of the upper support member, and an upper surface of the sheet body define a first space through which a first gas flows and whereby an upper surface of the plane portion of the lower support member, an inner wall surface of the frame portion of the lower support member, and a lower surface of the sheet body define a second space through which a second gas flows, and
   a flow control portion is formed on the lower surface of the plane portion of the upper support member in such a manner as to project downward from the lower surface for controlling a flow channel extending between an inlet through which the first gas flows into the first space, and an outlet through which the first gas flows out from the first space,
   wherein the flow control portion provides a first flow path for the first gas which meanders in a serpentine manner along the flow control portion from the inlet to the outlet and a second flow path for the first gas between the flow control portion and the upper surface of the sheet body which is unobstructed by the flow control portion from the inlet to the outlet, and
   wherein, with respect to a direction perpendicular to a planar direction of the sheet body, a first distance (T1), which is a distance between the upper surface of the sheet body and the lower surface of the plane portion of the upper support member, and a second distance (T2), which is a distance between the upper surface of the sheet body and a projecting end of the flow control portion, are such that the ratio (T2/T1) of the second distance (T2) to the first distance (T1) falls within a range of 2% to 50% inclusive.

2. A reactor according to claim 1, wherein the second distance is 20 μm or more.

3. A reactor according to claim 1, wherein each of the sheet bodies has a thickness of 20 μm to 500 μm inclusive.

4. A reactor according to claim 1, wherein each of the sheet bodies is a fired laminate of a solid electrolyte layer, a fuel electrode layer formed on an upper surface of the solid electrolyte layer, and an air electrode layer formed on a lower surface of the solid electrolyte layer;
   the first gas is a fuel gas, and the second gas is a gas that contains oxygen; and
   the reactor functions as a solid oxide fuel cell.

5. A reactor according to claim 1, wherein the first distance is 50 μm to 1,000 μm inclusive, and
   a minimum radius of curvature on an outer surface of the flow control portion projecting from the upper surface or the lower surface of the plane portion of the support member is 20 μm or more.

6. A reactor according to claim 1, wherein a current-collecting member which is confined in the first space and/or the second space for ensuring an electrical connection between the support member and the sheet body is used as the flow control portion.

7. A reactor comprising:
a single or a plurality of sheet bodies which contain at least ceramic and in which chemical reactions occur, and
a plurality of support members for supporting the single or the plurality of sheet bodies, each support member having a plane portion, and a frame portion provided along the entire perimeter of the plane portion and thicker than the plane portion,
the reactor being configured such that the single or the plurality of sheet bodies and the plurality of support members are stacked in alternating layers,
each of the sheet bodies is held between an upper support member, which is the support member adjacent to and located above the sheet body, and a lower support member, which is the support member adjacent to and located below the sheet body, in such a manner that a perimetric portion of the sheet body is sandwiched between the frame portion of the upper support member and the frame portion of the lower support member, whereby a lower surface of the plane portion of the upper support member, an inner wall surface of the frame portion of the upper support member, and an upper surface of the sheet body define a first space through which a first gas flows and whereby an upper surface of the plane portion of the lower support member, an inner wall surface of the frame portion of the lower support member, and a lower surface of the sheet body define a second space through which a second gas flows, and
a flow control portion is formed on the upper surface of the plane portion of the lower support member in such a manner as to project upward from the upper surface for controlling a flow channel extending between an inlet through which the second gas flows into the second space, and an outlet through which the second gas flows out from the second space,
wherein the flow control portion provides a first flow path for the second gas which meanders in a serpentine manner along the flow control portion from the inlet to the outlet and a second flow path for the second gas between the flow control portion and the lower surface of the sheet body which is unobstructed by the flow control portion from the inlet to the outlet, and
wherein, with respect to a direction perpendicular to a planar direction of the sheet body, a first distance (T1), which is a distance between the lower surface of the sheet body and the upper surface of the plane portion of the lower support member, and a second distance (T2), which is a distance between the lower surface of the sheet body and a projecting end of the flow control portion, are such that the ratio (T2/T1) of the second distance (T2) to the first distance (T1) falls within a range of 2% to 50% inclusive.

8. A reactor according to claim 7, wherein the second distance is 20 μm or more.

9. A reactor according to claim 7, wherein each of the sheet bodies has a thickness of 20 μm to 500 μm inclusive.

10. A reactor according to claim 2, wherein each of the sheet bodies is a fired laminate of a solid electrolyte layer, a fuel electrode layer formed on an upper surface of the solid electrolyte layer, and an air electrode layer formed on a lower surface of the solid electrolyte layer;
the first gas is a fuel gas, and the second gas is a gas that contains oxygen; and
the reactor functions as a solid oxide fuel cell.

11. A reactor according to claim 7, wherein the first distance is 50 μm to 1,000 μm inclusive, and
a minimum radius of curvature on an outer surface of the flow control portion projecting from the upper surface or the lower surface of the plane portion of the support member is 20 μm or more.

12. A reactor according to claim 7, wherein a current-collecting member which is confined in the first space and/or the second space for ensuring an electrical connection between the support member and the sheet body is used as the flow control portion.

* * * * *